US008922543B2

(12) United States Patent
Zhao

(10) Patent No.: US 8,922,543 B2
(45) Date of Patent: Dec. 30, 2014

(54) PWM VOLTAGE REGULATOR CIRCUIT, REGULATING METHOD USING THE SAME, AND LIQUID CRYSTAL DISPLAY DEVICE

(75) Inventor: Dengxia Zhao, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 452 days.

(21) Appl. No.: 13/378,798

(22) PCT Filed: Dec. 3, 2011

(86) PCT No.: PCT/CN2011/083419
§ 371 (c)(1),
(2), (4) Date: Dec. 16, 2011

(87) PCT Pub. No.: WO2013/053176
PCT Pub. Date: Apr. 18, 2013

(65) Prior Publication Data
US 2013/0093746 A1     Apr. 18, 2013

(30) Foreign Application Priority Data
Oct. 12, 2011   (CN) .......................... 2011 1 0308494

(51) Int. Cl.
G09G 5/00    (2006.01)
G09G 3/36    (2006.01)
(52) U.S. Cl.
CPC ...................................... G09G 3/36 (2013.01)
USPC ............................. 345/212; 345/87; 345/211
(58) Field of Classification Search
USPC ................... 345/87–104, 204–214, 690–699
See application file for complete search history.

(56) References Cited

U.S. PATENT DOCUMENTS

| 5,884,125 | A | * | 3/1999 | Taniguchi et al. | ............. 399/128 |
| 7,868,744 | B2 | * | 1/2011 | Araki et al. | ................ 340/407.1 |
| 2004/0000897 | A1 | | 1/2004 | Asayama | |
| 2008/0309467 | A1 | * | 12/2008 | Araki et al. | ................ 340/407.1 |
| 2010/0033467 | A1 | * | 2/2010 | Park | .............................. 345/211 |
| 2010/0171481 | A1 | * | 7/2010 | Liu | ............................... 323/283 |

(Continued)

FOREIGN PATENT DOCUMENTS

| CN | 1721943 A | 1/2006 |
| CN | 101324823 A | 12/2008 |

(Continued)

OTHER PUBLICATIONS

Liu Feng, the first office action, Oct. 2012, CN.

(Continued)

*Primary Examiner* — Dmitriy Bolotin
(74) *Attorney, Agent, or Firm* — IPro, Inc.; Na Xu

(57) ABSTRACT

The invention discloses a PWM voltage regulator circuit, a regulating method using the same, and a liquid crystal display comprising the same. The PWM voltage regulator circuit comprises a PWM voltage regulating module, a feedback module connected with the PWM voltage regulating module, and a control module connected with the feedback module. The control module comprises a programmable image processing chip; and the programmable image processing chip comprises at least one memory bank (bank) and an access circuit. A feedback comparing reference voltage data of the PWM voltage regulating module is stored in a memory bank (bank), and the memory bank (bank) is connected with the feedback module by the access circuit. The invention can quickly regulate a PWM chip output voltage, increase IC generality, and reduce the product cost.

13 Claims, 2 Drawing Sheets

(56) References Cited

U.S. PATENT DOCUMENTS

| | | | |
|---|---|---|---|
| 2011/0141098 A1* | 6/2011 | Yaguma et al. | 345/212 |
| 2012/0049830 A1* | 3/2012 | Watanabe | 323/293 |
| 2012/0086422 A1* | 4/2012 | Ito et al. | 323/284 |
| 2012/0169310 A1* | 7/2012 | Dearborn et al. | 323/271 |

FOREIGN PATENT DOCUMENTS

| | | |
|---|---|---|
| CN | 101364388 A | 2/2009 |
| CN | 101645652 A | 2/2010 |
| CN | 101833929 A | 9/2010 |
| CN | 201773565 U | 3/2011 |
| JP | 6236161 A | 8/1994 |

OTHER PUBLICATIONS

Song Xuemei, the International Searching Authority written comments, Jul. 2012, CN.

* cited by examiner

PWM VOLTAGE REGULATOR CIRCUIT, REGULATING METHOD USING THE SAME, AND LIQUID CRYSTAL DISPLAY DEVICE

TECHNICAL FIELD

The invention relates to the field of liquid crystal display, and more particularly to a PWM voltage regulator circuit, a regulating method using the same, and a liquid crystal display comprising the same.

BACKGROUND

At present, most liquid crystal displays employ a PWM mode to regulate an output voltage. The output voltage value of a DC/DC section is determined by different panel manufacturing processes. In design of PWM chip magnitude of voltage, the DC/DC output voltage is usually controlled by regulating an external divider resistor. However, this method has a limited regulation precision and low speed of response. Some of the EEPROM code is directly accessed by the I²C and then converted into a PWM chip feedback voltage by a digital-analog conversion module (DAC) in a PWM chip. Therefore, another set of ROM and digital-analog conversion module (DAC) is added to the PWM chip, which increases the size and cost of the PWM chip.

SUMMARY

The aim of the invention is to provide a PWM voltage regulator circuit, and a regulating method using the same, and a liquid crystal display comprising the same that feature a low cost and high speed of response.

The purpose of the invention is achieved by the following technical schemes:

A PWM voltage regulator circuit comprises: a PWM voltage regulating module, a feedback module connected with the PWM voltage regulating module, and a control module connected with the feedback module, wherein the control module comprises a programmable image processing chip; the programmable image processing chip comprises at least one memory bank and an access circuit; a feedback comparing reference voltage data of the PWM voltage regulating module is stored in the memory bank; and the memory bank is connected with the feedback module by the access circuit.

Preferably, the access circuit is a digital-analog conversion module, and the feedback comparing reference voltage data is connected with the feedback module via the digital-analog conversion module. The feedback comparing reference voltage data is digital information, while the feedback module requires an analog level signal. Thus, the digital information needs to be converted into the analog level signal by the digital-analog conversion module.

Preferably, the memory bank is two in number, and the control module further comprises a memory bank chip selection module; the output ends of the two memory banks are connected with the digital-analog conversion module via the memory bank chip selection module. In order for the programmable image processing chip to have both image processing function and voltage regulating function, the memory bank chip selection module is added to access different memory bank data as required to achieve different functions.

Preferably, the control module comprises a time schedule controller; the feedback comparing reference voltage data is stored into a set memory bank via the time schedule controller. Through the time schedule controller, the efficient and quick access of the memory bank data can be controlled by a sequence signal controlled by liquid crystal.

Preferably, the control module comprises an I²C interface logic and a non-volatile memory; the feedback comparing reference voltage data is received by the I²C interface logic and stored into the non-volatile memory by the time schedule controller. The I²C interface logic can access currently widely-used I²C bus data, with a high transmission rate. The non-volatile memory can store buffer data and accelerate the speed of response.

Preferably, the working voltage and reference voltage of the control module are provided by the PWM voltage regulating module, which simplifies the circuit and reduces the cost.

A PWM voltage regulating method, comprises steps as follows:

A: storing a feedback comparing reference voltage data into one of memory banks of a programmable image processing chip; and B: accessing the feedback comparing reference voltage data by an access circuit from the memory bank and sending to a feedback module.

Preferably, the access circuit in step B is a digital-analog conversion module, and the feedback comparing reference voltage data is accessed by the digital-analog conversion module from the memory bank and sent to the feedback module. This is an example of the access circuit.

Preferably, the control module in step B comprises a memory bank chip selection module; the feedback comparing reference voltage data is output to the digital-analog conversion module by a chip selection signal. This is an example of a comparing reference voltage data output control mode, which makes the programmable image processing chip have miscellaneous functions.

Preferably, the control module comprises a time schedule controller; the feedback comparing reference voltage data is stored into a set memory bank by the time schedule controller. This is an example of a storage and calling method of the feedback comparing reference voltage data.

Preferably, the control module comprises an I²C interface logic and a non-volatile memory; the feedback comparing reference voltage data is stored first into the non-volatile memory and then into a specified memory bank by the time schedule controller. The response and processing speed can be increased by accessing data using an I²C bus and prestoring the data by the non-volatile memory.

A liquid crystal display comprises the PWM voltage regulator circuit.

It is studied and found by the inventor that liquid crystal displays of the prior art have a programmable image access chip (P-GAM IC), and a plurality of memory banks are arranged in the chip; therefore, one of the memory banks is used in the invention to store the feedback comparing reference voltage data, then a voltage regulating signal is output to the feedback module by the programmable image access chip (P-GAM IC), and the output voltage of the PWM chip is regulated by the feedback module. Thus, no additional memory and digital-analog conversion module is needed, and PWM digitized voltage regulation can be realized by making full use of the existing chip. The memory bank in the programmable image access chip (P-GAM IC) and a digital-analog conversion module (DAC) are used to provide the feedback comparing reference voltage of the PWM chip, thereby achieving the purpose of quickly regulating the output voltage of the PWM chip; the IC generality is increased and the product cost is reduced by entering codes externally.

DETAILED DESCRIPTION

The invention is further described by figures and the preferred embodiments as follows.

Figure 1:
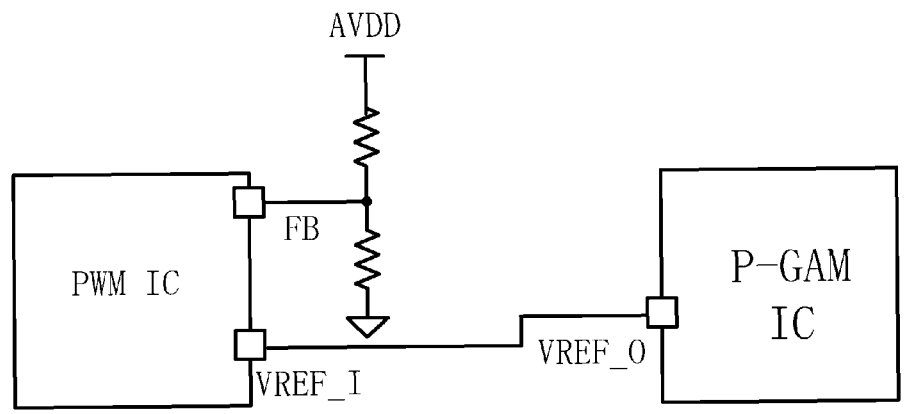
FIG. 1 is a functional block diagram of the invention.
Figure 2:
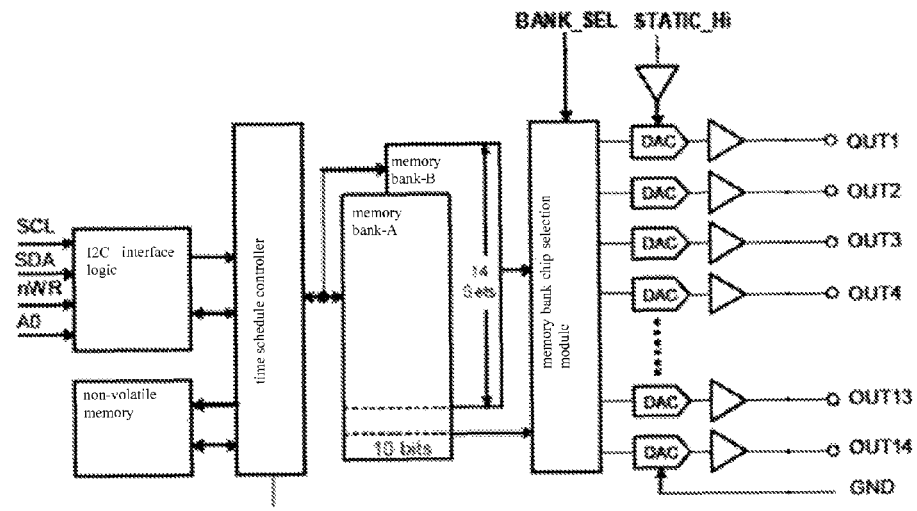
FIG. 2 is a functional block diagram of a control module.
Figure 3:
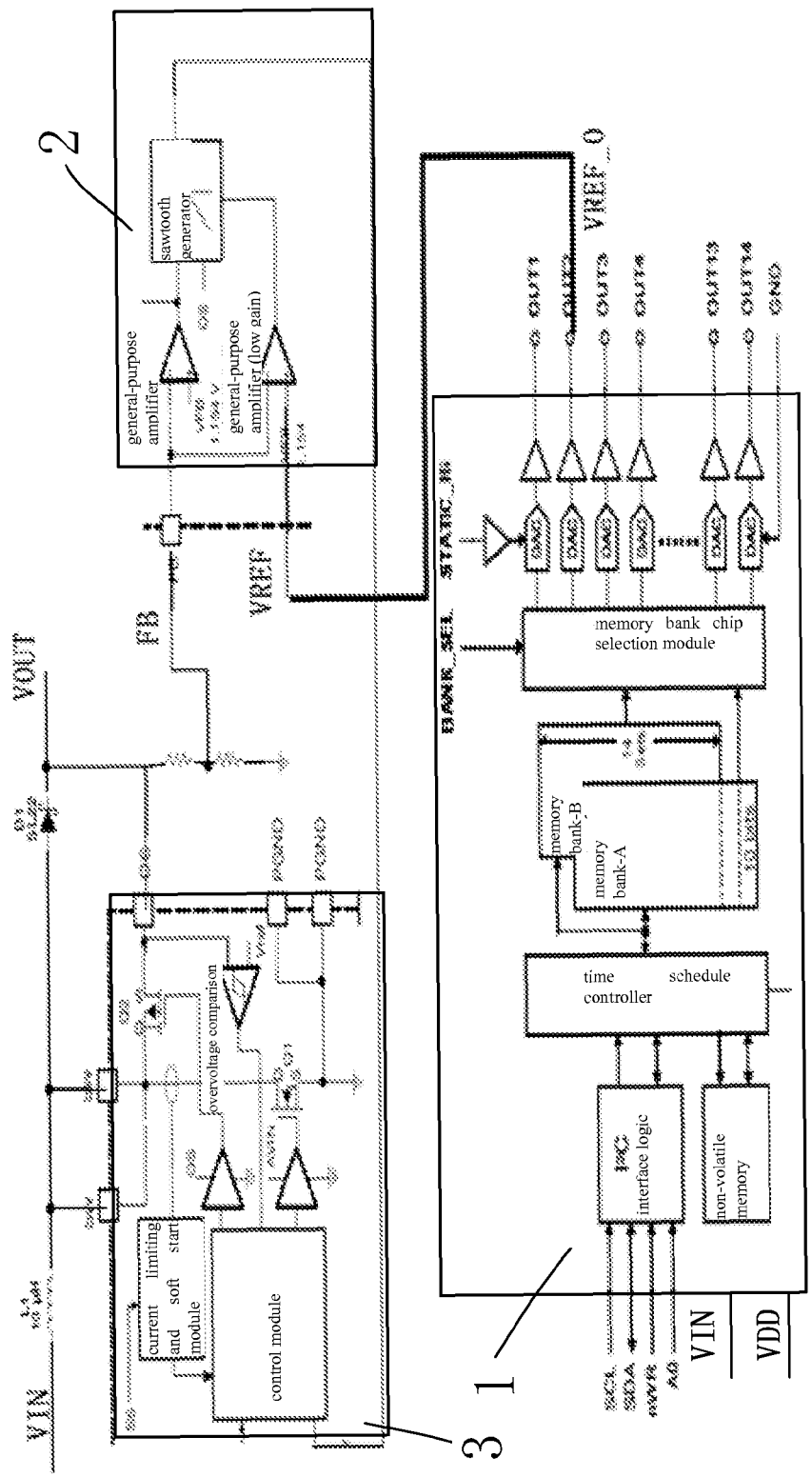
FIG. 3 is a functional block diagram of a PWM voltage regulator circuit;
Wherein: 1. control module, 2. feedback module, 3. PWM voltage regulating module.

As shown in FIGS. 1-3, a PWM voltage regulator circuit, comprises: a PWM voltage regulating module 3, a feedback module 2 connected with the PWM voltage regulating module 3, and a control module 1 connected with the feedback module 2. The control module 1 comprises a programmable image processing chip, and the programmable image processing chip comprises at least one memory bank and an access circuit. A feedback comparing reference voltage date of the PWM voltage regulating module 3 is stored in the memory bank, and the memory bank is connected with the feedback module 2 via the access circuit. The conception of the invention is further interpreted by specific embodiments as follows:

As shown in FIG. 2, the control module 1 comprises the programmable image processing chip, and the programmable image processing chip comprises two memory banks. The signal input end of the control module 1 is connected with an I²C interface logic; data on the I²C bus is accessed and stored first into a non-volatile memory and then into a specific memory bank by a time schedule controller in accordance with a time schedule control signal of an LCD device. The output ends of the two memory banks are connected with a digital-analog conversion module via a memory bank chip selection module, and data of the digital-analog conversion module is selected and accessed by the memory bank chip selection module via a chip selection signal BANK_SEL.

As shown in FIG. 3, the feedback comparing reference voltage data is converted into an analog level signal VREF_0 by the digital-analog conversion module and output to the feedback module 2 for voltage regulation.

The I²C interface logic, the time schedule controller, the non-volatile memory, the memory bank chip selection module, and the digital-analog conversion module can be integrated into the programmable image processing chip or distributed in rows.

The connection mode of a PWM chip and the programmable image access chip (P-GAM IC) is shown in FIG. 1. The inner structure of the programmable image access chip (P-GAM IC) is shown in FIG. 2. Two memory banks are arranged in the programmable image access chip (P-GAM IC). Assuming the PWM chip comprises only one buck circuit (Buck) and one boost circuit (Boost), the operational principle is that after VIN(12V) is energized, the buck circuit (Buck) of the PWM chip produces a 3.3 V voltage (VDD) on the programmable image access chip (P-GAM IC) to control the logical gate; simultaneously, a 12 V reference voltage is produced in the programmable image access chip (P-GAM IC); the code, i. e. the feedback comparing reference voltage data (VREF_0), of one memory bank is accessed by the programmable image access chip (P-GAM IC); a feedback comparing reference voltage required by the boost circuit (Boost) to the PWM chip is produced by the digital-analog conversion module (DAC); after the feedback comparing reference voltage is generated, an enable signal is provided to the boost circuit (Boost), and the boost circuit (Boost) is started, the PWM chip operates normally.

The invention is described in detail in accordance with the above contents with the specific preferred embodiments. However, this invention is not limited to the specific embodiments. For the ordinary technical personnel of the technical field of the invention, on the premise of keeping the concept of the invention, the technical personnel can also make simple deductions or replacements, and all of which should be considered to belong to the protection scope of the invention.

I claim:

1. A pulse-width modulation (PWM) voltage regulator circuit, comprising: a PWM voltage regulating module, a feedback module connected with the PWM voltage regulating module, and a control module connected with the feedback module, wherein the control module comprises a programmable image processing chip; the programmable image processing chip comprises at least one memory bank and an access circuit; a feedback comparing reference voltage data of the PWM voltage regulating module is stored in a memory bank; and the memory bank is connected with the feedback module by the access circuit, wherein a working voltage and a reference voltage of said control module are provided by the PWM voltage regulating module.

2. The PWM voltage regulator circuit of claim 1, wherein said access circuit is a digital-analog conversion module, and said feedback comparing reference voltage data is connected with the feedback module via the digital-analog conversion module.

3. The PWM voltage regulator circuit of claim 2, wherein the memory bank is two in number, and the control module further comprises a memory bank chip selection module; the output ends of the two memory banks are connected with the digital-analog conversion module via the memory bank chip selection module.

4. The PWM voltage regulator circuit of claim 3, wherein said control module comprises a time schedule controller; the feedback comparing reference voltage data is stored into a set memory bank via the time schedule controller.

5. The PWM voltage regulator circuit of claim 4, wherein said control module comprises an I²C interface logic and a non-volatile memory; the feedback comparing reference voltage data is received by the I²C interface logic and stored into the non-volatile memory by the time schedule controller.

6. A pulse-width modulation (PWM) voltage regulating method, comprising steps as follows:
  A: storing a feedback comparing reference voltage data into one of memory banks of a programmable image processing chip; and
  B: accessing the feedback comparing reference voltage data by an access circuit from the memory bank and sending to a feedback module, wherein said access circuit in step B is a digital-analog conversion module, and the feedback comparing reference voltage data is accessed by the digital-analog conversion module from the memory bank and sent to the feedback module, wherein said control module in step B comprises a memory bank chip selection module; the feedback comparing reference voltage data is output to the digital-analog conversion module by a chip selection signal.

7. The voltage regulating method of claim 6, wherein said control module comprises a time schedule controller; the feedback comparing reference voltage data is stored into a set memory bank by the time schedule controller.

8. The PWM voltage regulating method of claim 7, wherein said control module comprises an I²C interface logic and a non-volatile memory; the feedback comparing reference voltage data is stored first into the non-volatile memory and then into a specified memory bank by the time schedule controller.

9. A liquid crystal display, comprising: a pulse-width modulation (PWM) voltage regulator circuit, wherein the PWM voltage regulator circuit comprises a PWM voltage regulating module, a feedback module connected with the PWM voltage regulating module, and a control module connected with the feedback module, wherein the control module comprises a programmable image processing chip; the programmable image processing chip comprises at least one memory bank and an access circuit; a feedback comparing reference voltage data of the PWM voltage regulating module is stored in a memory bank; and the memory bank is connected with the feedback module by the access circuit, wherein a working voltage and a reference voltage of said control module are provided by the PWM voltage regulating module.

10. The liquid crystal display of claim 9, wherein said access circuit is a digital-analog conversion module, and said feedback comparing reference voltage data is connected with the feedback module via the digital-analog conversion module.

11. The liquid crystal display of claim 10, wherein the memory bank is two in number, and the control module further comprises a memory bank chip selection module; the output ends of the two memory banks are connected with the digital-analog conversion module via the memory bank chip selection module.

12. The liquid crystal display of claim 11, wherein said control module comprises a time schedule controller; the feedback comparing reference voltage data is stored into a set memory bank via the time schedule controller.

13. The liquid crystal display of claim 12, wherein said control module comprises an I²C interface logic and a non-volatile memory; the feedback comparing reference voltage data is received by the I²C interface logic and stored into the non-volatile memory by the time schedule controller.

* * * * *